Jan. 24, 1956

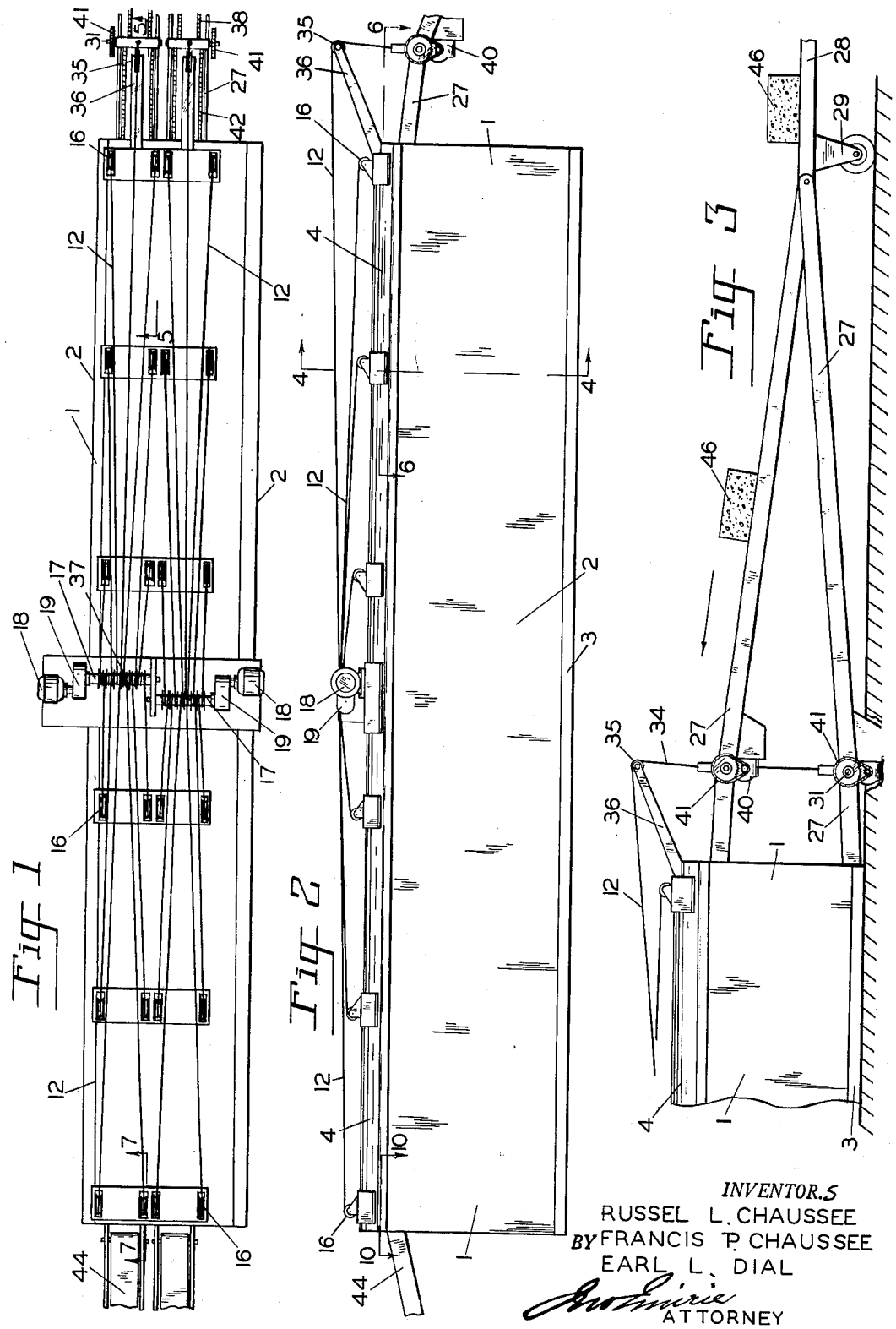

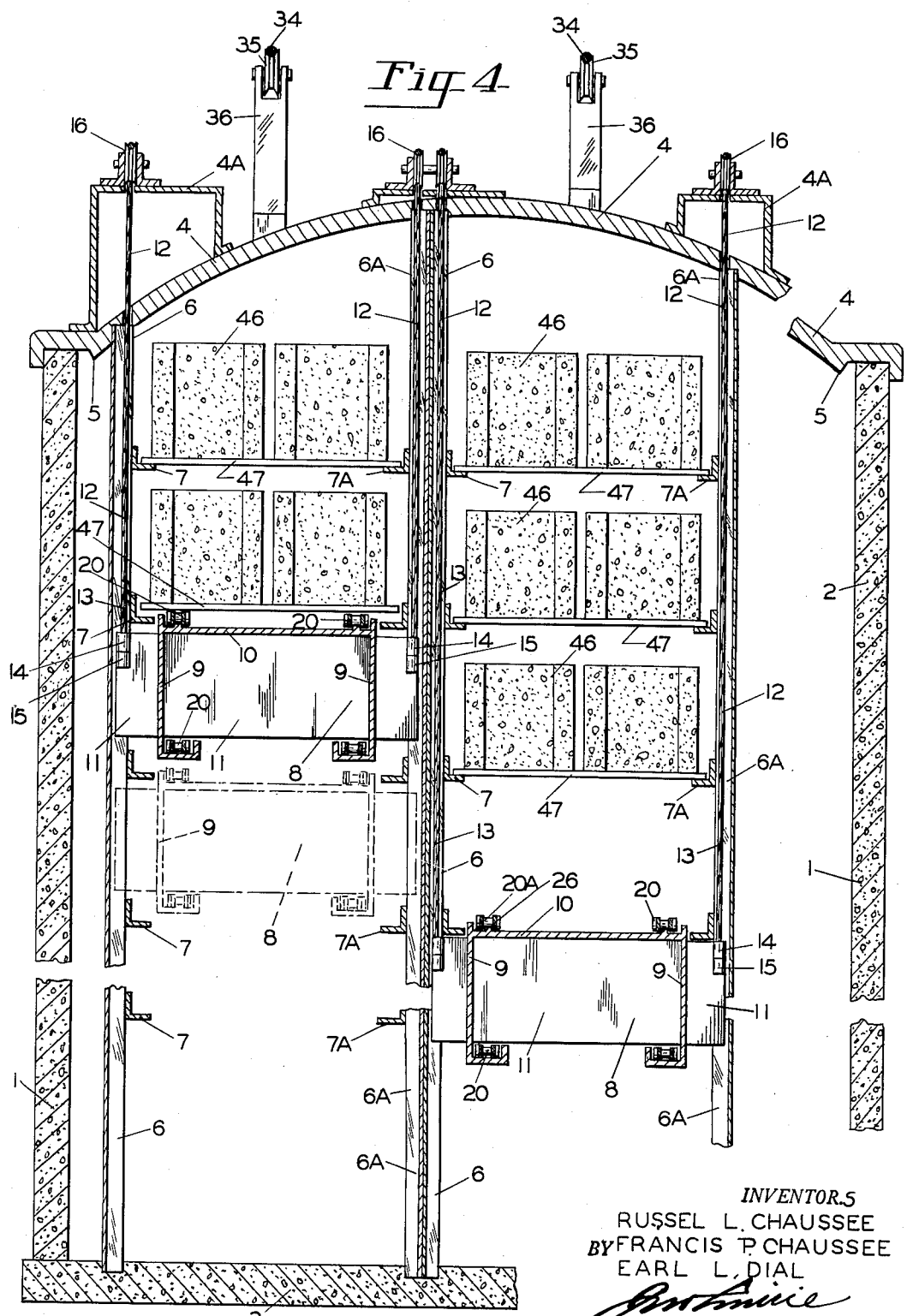

R. L. CHAUSSEE ET AL 2,732,084

CURING CHAMBERS

Filed Dec. 19, 1952

INVENTOR.
RUSSEL L. CHAUSSEE
BY FRANCIS P. CHAUSSEE
EARL L. DIAL

ATTORNEY

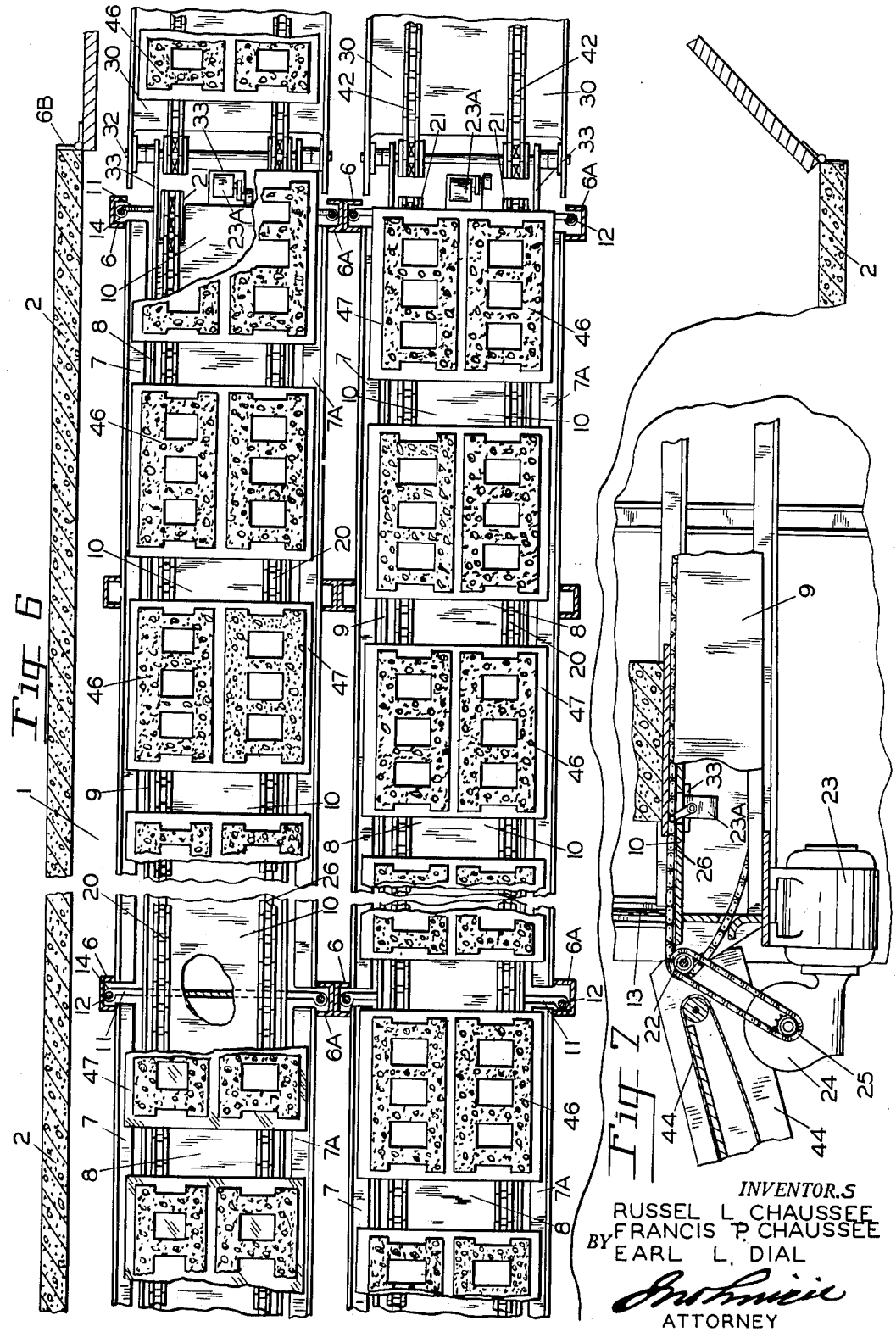

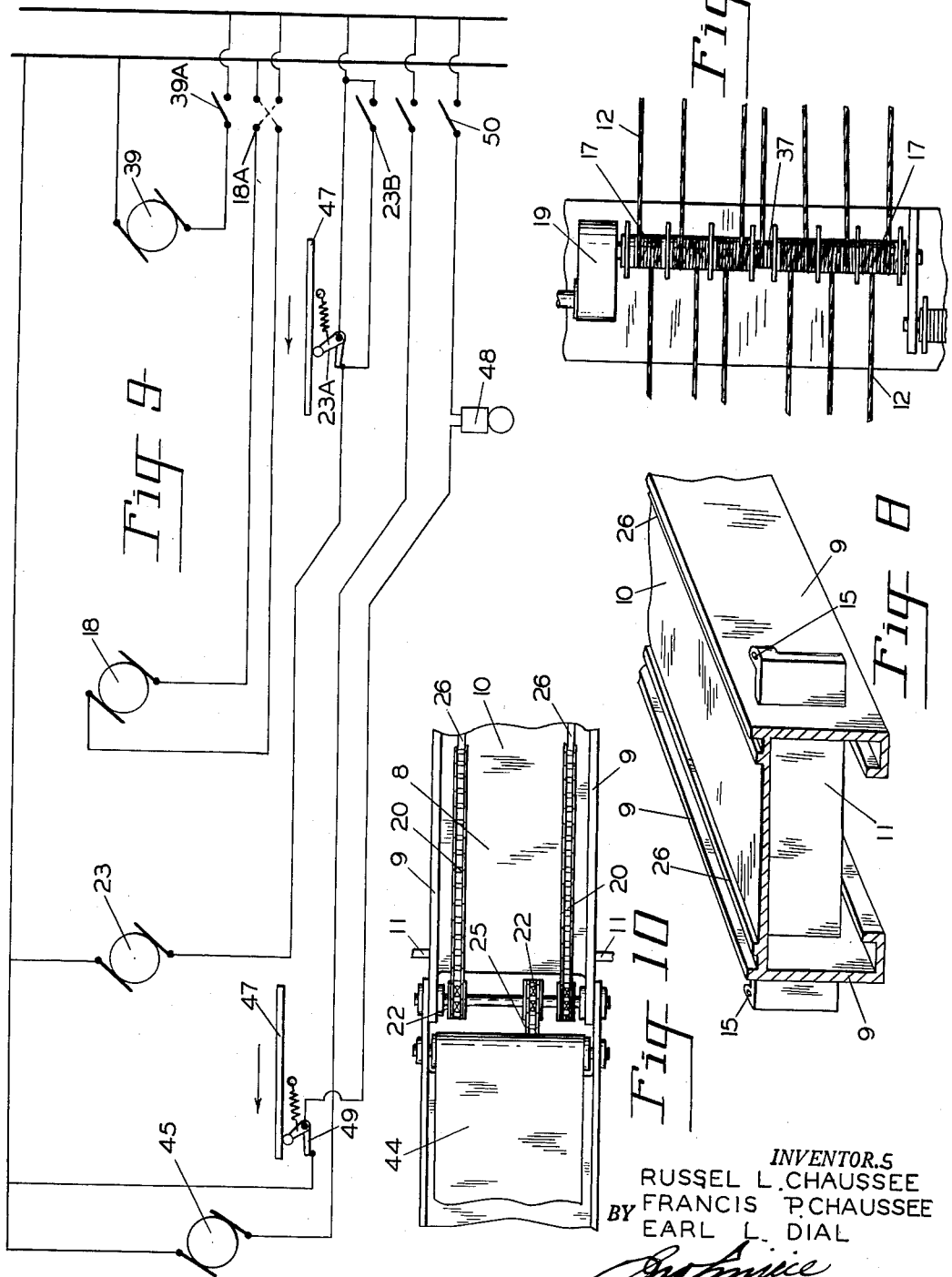

United States Patent Office 2,732,084
Patented Jan. 24, 1956

2,732,084
CURING CHAMBERS

Russel L. Chaussee and Francis P. Chaussee, Wenatchee, and Earl L. Dial, Kennewich, Wash., assignors of one-fourth to Harvey Stoller, Kennewich, Wash.

Application December 19, 1952, Serial No. 327,012

7 Claims. (Cl. 214—16.4)

This invention relates to curing chambers and is particularly adapted for the curing of concrete, pumice blocks, refrigeration, fumigating, baking enamel and so forth.

The primary object of this invention is the placing of objects to be cured within a curing chamber, each object being spaced from the other in all directions with a sufficient drying or refrigerant between the same to permit the circulation of a curing agent thereabout.

In order to carry out this object, the materials to be cured are arranged in rows or tiers, one above the other and side by side, each of the objects being spaced apart within the rows by automatic means.

A further object of the invention is the providing of a single conveyor for arranging the materials or objects in rows one above the other from top to the bottom of the curing chamber, the said conveyor being moved vertically from one level to another in the placing or removing of the objects.

A still further object of the invention is the placing of the objects or materials within a curing chamber and removing the same therefrom by a special conveyor wherein the objects can be handled without jolting, which is particularly important in the curing of concrete or pumice blocks. Heretofore in the case of blocks, the blocks were placed in the curing chambers by trucks operated by hand, which caused cracking or disintegrating of the blocks before they were cured while placing them in the curing chamber.

With our new and improved method of arranging objects or materials within curing chambers, a greater number of objects can be cured at one time, and requiring a minimum of material for curing and treating the same.

These and other incidental objects will be apparent in the drawings, specification and claims.

Referring to the drawings:

Figure 1 is a plan view of our new and improved curing chamber.

Figure 2 is a side view of Figure 1.

Figure 3 is a fragmentary side view of the chamber, illustrating the conveyors for delivering objects or materials to the chamber, as for instance concrete or pumice blocks.

Figure 4 is an end sectional view, taken on line 4—4 of Figure 2, looking in the direction indicated.

Figure 5 is a fragmentary enlarged side sectional view, taken on line 5—5 of Figure 1, looking in the direction indicated, particularly illustrating the conveyor mechanism.

Figure 6 is an enlarged plan sectional view, taken on line 6—6 of Figure 2, illustrating the conveyor mechanism.

Figure 7 is an enlarged fragmentary side sectional view, taken on line 7—7 of Figure 1.

Figure 8 is a fragmentary perspective end sectional view of the conveyor framework.

Figure 9 is a diagrammatical layout of the electric control system for controlling the operation of the conveyor.

Figure 10 is a fragmentary plan view illustrating the discharge end of the conveyor.

Figure 11 is a fragmentary plan view of the winding drums for raising and lowering the conveyor.

Referring more specifically to the drawings:

While our invention is adapted to various uses, as for instance the drying of concrete or pumice blocks, fumigating of objects and materials, placing food stuffs and the like in refrigerators, baking enamel and many other uses, in our description we will limit the same to the curing of concrete or pumice blocks.

Our invention consists of a curing chamber 1, consisting of side walls 2 and a bottom 3, having a dome shaped ceiling or top 4. The top 4 has drip edges 5 running longitudinally of the same. The object of the dome-shaped top is to drain condensation to the drip edges 5, preventing the same from dripping on to the objects or material being cured.

In the construction of our curing chambers, the bottom 3 slopes to one or both ends of the chamber so that the curing materials, such as condensed steam, can be returned to the source of supply, thereby reducing the cost of materials used in the curing operation.

Our invention further consists of the arrangement of storage racks. These racks consist of vertical supports 6 and 6A, having longitudinal angle rails 7 and 7A running throughout the length of the curing chamber. There may be as many rows or racks as desired within the curing chamber. Horizontally suspended between the rails 7 and 7A is a conveyor 8 running from one end of the chamber to the other. This conveyor consists of side rails 9, which are connected together by the web 10, referring particularly to Figures 4, 5, 6 and 8. Transverse beams 11 are disposed at intervals throughout the length of the conveyor. The outer ends of these transverse beams are adapted to register with the vertical channel supports 6 and 6A, best illustrated in Figures 4, 5 and 6.

It will be noted that the longitudinal angle rails 7 and 7A are separated where they connect to the vertical supports where the beams 11 operate, permitting the up and down movement of the said beams within the vertical channels 6 and 6A. The conveyor 8 is supported within the rack assembly by the cables 12. The lower ends 13 of the cables being dead-ended to the transverse beams 11 of the conveyor at 14 by the usual cable ferrules 15.

The cables 12 are trained about the sheaves 16, which are mounted to the top 4 of the curing chamber, as best illustrated in Figures 1, 2, 4 and 5. The conveyor 8 is supported at intervals by the cables 12 throughout the length of the curing chamber. The cables supporting the same being wrapped about the winding drum 17, which is also mounted to the top of the curing chamber and is driven by the motor 18 through a speed reducer 19.

A pair of roller chains 20 are trained about the idler sprockets 21 at the entrance end of the conveyor 8 and about the driving sprockets 22 at the discharge end of the conveyor. The sprockets 22 are keyed to the shaft 22A, which is journalled within bearings mounted to the conveyor 8, the said sprockets are driven by the motor 23 mounted to the conveyor 8, as best illustrated in Figure 7. A speed reducer 24 drives the said sprockets by way of the drive chain 25. The rollers 20A of the roller chains 20 travel over the rails 26 forming part of the web 10 of the conveyor, as best illustrated in Figures 4 and 8. This insures their free and easy operation while carrying the objects being cured.

A conveyor 27 delivers the objects of materials from their source to the conveyor 8. The conveyor 27 is supported at its lower end by any suitable means, as on the conveyor 28 which in turn is mounted on a support 29. The upper end of the conveyor 27 has a section 30 pivotally connected to the cross shaft 31 at its one end, its opposite end being pivotally connected to the cross shaft 32, which in turn is pivotally connected to the brackets 33 which form part of the conveyor 8. The upper end of the conveyor 27 is supported by the cable 34, which is trained about the sheave 35, which in turn is journalled to the supporting brackets 36. This cable is trained about the drum 37 forming part of the drum 17.

The drum 37 is of a smaller diameter than the drum 17, the object of which is to maintain the action of the conveyor 27 at a relatively straight line position in regards to the conveyor 8, so that it will not jar the blocks while being tansferred from the conveyor 27 to the conveyor 8 as the conveyor is raised and lowered from one tier to another, which will be fully described later.

The conveyor chains 38 of the conveyor 27 are driven from the motor 39, speed reducer 40 and the drive chain 41, as best illustrated in Figure 5. The chains 42 of the conveyor section 30 are driven from the shaft 31 and are maintained in taut condition by the tightener 43.

Referring to Figure 7, the objects or materials are delivered away from the curing chamber by the belt conveyor 44, which is driven by a separate motor 45 shown only in the wiring diagram, Figure 9. In the case of concrete or pumice blocks being cured, the blocks 46 are delivered to the curing chamber on pallets 47 directly from the block making machine.

We will now describe the operation of our new and improved curing chamber. In the case of block curing, the blocks 46 and the pallets 47 are delivered from the block making machine on to the conveyor 28. They are moved to the curing chamber by the chains 38 and 42 of the conveyor 27 and the section 30 of the conveyor, by closing the switch 39A, Figure 9, operating the motor 39, which drives the speed reducer 40, driving chain 41 and the cross shaft 31, which in turn drives the said conveyor chains in the direction of the arrow.

When the forward end of the pallets 47 reach the switch 23A they close the same, starting the motor 23 driving the conveyor chains 20 in the direction of the arrows. When the rear end of the pallet clears the switch 23A the motor 23 will be stopped, together with the conveyor chains 20 until the next pallet operates the said switch 23A, again moving the said conveyor chain and the pallets, including the blocks thereon further into the cooling chamber.

Between the opening of the switch 23A by the moving forward of one pallet and the contacting of the next to follow, provides a definite spacing of the pallets and blocks so that a curing agent can completely pass between the ends of the block being cured.

Referring to Figure 7, when the conveyor 8 has been completely loaded and the forward end of the first pallet reaches the automatic switch 49, it will close the said switch, energizing a signal bell 48, which will tell the operator that the conveyor 8 is completely loaded with objects or material being cured. The operator will then open the switch 39A, stopping the motor 39 and the movement of the conveyor 27. The operator will then close the reversing switch 18A starting the motor 18, rotating the motor 18, rotating the drums 17 and 37, referring to Figures 1 and 2, unwinding the cables 12 and 34, which will lower the conveyor 8 down to the next row or tier of angle rails 7 and 7A to the position as illustrated in Figure 4 by the broken lines.

In lowering the conveyor, the pallets will come to rest on the rails 7 and 7A supporting the complete row or tier of pallets throughout the length of the curing chamber. When the conveyor is dropped to the broken line position, the cycle of operation above described, can be repeated by entering the pallet and blocks on to the conveyor until the conveyor is again filled, when again the same will be dropped the distance of one tier of supporting rails 7 and 7A.

In order to keep the angle of the conveyor 27 at a minimum angle to the conveyor 8, the cable 34 lowers the conveyor 27 at a slightly slower rate of speed than the conveyor 8, therefore the drum 37 is of a smaller diameter than the winding drums 17.

When the chamber is completely filled, the ends of the chamber are closed tightly by doors, after which the curing agent, as steam, enters the chamber. The method of entering is not shown, as it is of well known practice. After the blocks have been cured, the reversing switch 18A is operated so as to cause the motor 18 to wind the cables 12 and 34 on the drums 17 and 37, raising the conveyor a sufficient distance to lift the bottom row of pallets and blocks above the supporting rails 7 and 7A, after which the switch 23B is closed starting the motor 23, moving the conveyor chains 20 so as to discharge the pallets and blocks upon the conveyor 44, Figure 7, from where they are removed and stacked by operators not here shown.

The switch 23B by-passes the automatic switch 23A providing for a continuous movement of the conveyor chains 20. After the first or lower tier of blocks are removed the conveyor is raised to the next tier of blocks, raising the pallets from the rails 7 and 7A and then continuing to move them towards the discharge end of the curing chamber. When the blocks or objects are being removed from the curing chamber by the conveyor 8, the circuit of the signal bell 48 is opened by the switch 50 so that the signal will not be operating each time a pallet passes the switch 49.

In our drawings we have illustrated two rows of racks side by side, which includes two conveyors. There could be as many rows and racks of conveyors as desired within any curing chamber. We have only illustrated in the wiring diagram the controls for one conveyor and row of racks. There would be as many of these wiring hook-ups as there would be conveyors 8.

What we claim is:

1. A storage chamber comprising an enclosure, a plurality of pairs of spaced rails disposed in vertically spaced alignment and extending longitudinally in said enclosure, a loading and unloading conveyor extending longitudinally of said enclosure, means movably supporting said conveyor for vertical movement between the respective rails of said pairs of rails for selective cooperation with each pair of rails, a supply conveyor and a discharge conveyor pivotally connected to the respective ends of said loading conveyor and vertically movable therewith, said supply conveyor comprising a main section and a sub-section in alignment and pivotally connected together, said sub-section being disposed between said main section and said loading conveyor, and means movably supporting said supply conveyor at the pivotal connection between said sections, said supporting means for said loading and supply conveyors comprising power operated means for moving said conveyors vertically, said power operated means moves said supply conveyor at a slower rate than said loading conveyor, said conveyor moving means comprising cables supporting said conveyors and wound on driven drums, the drum on which the supply conveyor cables are wound having a smaller diameter than the other said drums.

2. Apparatus as defined in claim 1 comprising an electric motor drivingly connected with said loading conveyor, a switch in circuit with said motor, said switch being disposed adjacent the pivotally connected ends of said conveyors, and a control member for said switch and extending above the level of said conveyors to be actuated by an article fed from said supply conveyor to said loading conveyor to thereby start said loading conveyor.

3. Apparatus as defined in claim 2 wherein said switch is closed only while said control member is actuated by an article.

4. Apparatus as defined in claim 3 comprising a bypass circuit around said switch and a manually operable switch in said bypass circuit.

5. Apparatus as defined in claim 3 comprising a second switch adjacent the other end of said loading conveyor, a signal in circuit with said second switch, and a control member for said switch and extending above said conveyor to be actuated by articles thereon.

6. Apparatus as defined in claim 1 wherein said enclosure comprises a floor, top, and side walls, said top wall tapering toward at least one of said side walls and having a drip edge adjacent thereto.

7. Apparatus as defined in claim 6 wherein said floor slopes toward at least one of said side walls.

References Cited in the file of this patent

UNITED STATES PATENTS

| | | |
|---|---|---|
| 688,152 | Atwood | Dec. 3, 1901 |
| 1,490,076 | Luce | Apr. 8, 1924 |